(12) United States Patent
Rajalingam et al.

(10) Patent No.: US 9,600,213 B1
(45) Date of Patent: Mar. 21, 2017

(54) CUSTOMIZED PRINT JOB ANALYSIS TO IDENTIFY JOB COMPLEXITY

(71) Applicant: KONICA MINOLTA LABORATORY U.S.A., INC., San Mateo, CA (US)

(72) Inventors: Sivaraman Rajalingam, Fremont, CA (US); Geoff W. Harmon, Hayward, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 14/840,539

(22) Filed: Aug. 31, 2015

(51) Int. Cl.
*G06F 3/12* (2006.01)
*G06K 15/00* (2006.01)

(52) U.S. Cl.
CPC .......... *G06F 3/1208* (2013.01); *G06F 3/126* (2013.01); *G06F 3/1259* (2013.01); *G06F 3/1272* (2013.01)

(58) Field of Classification Search
CPC . G06F 3/12; G06F 3/125; G06F 3/126; G06F 3/1204; G06F 3/1226; G06F 3/1241; G06F 3/1288; G06F 3/1276; G06F 3/1246; G06F 3/1232; H04N 1/6072; G06T 5/001; G06K 9/00456

USPC .......... 358/1.13–1.18; 399/82, 83; 382/187, 382/199, 218, 286
See application file for complete search history.

(56) References Cited

U.S. PATENT DOCUMENTS

| | | | |
|---|---|---|---|
| 6,327,050 B1 * | 12/2001 | Motamed | G06K 15/1857 358/1.15 |
| 6,975,820 B2 | 12/2005 | Wong | |
| 7,209,258 B1 * | 4/2007 | Markovic | G06T 11/203 358/1.16 |
| 7,812,980 B2 | 10/2010 | Matsubara | |
| 8,223,385 B2 | 7/2012 | Minhas | |
| 8,384,927 B2 | 2/2013 | Harmon et al. | |
| 8,559,036 B1 * | 10/2013 | Khafizova | G06F 3/1204 358/1.13 |
| 2006/0002628 A1 * | 1/2006 | Dolan | G06K 9/00456 382/286 |
| 2014/0153038 A1 * | 6/2014 | Pan | G06F 3/1226 358/1.15 |

* cited by examiner

Primary Examiner — Gabriel Garcia
(74) Attorney, Agent, or Firm — Chen Yoshimura LLP

(57) ABSTRACT

Disclosed is a print solution that provides efficient managing, routing and processing of print jobs in a print shop. Particularly, the print solution applies a customized algorithm that analyzes the job complexity of all print jobs and based on the job complexity analysis, routes print jobs to the correct printers for printing.

16 Claims, 7 Drawing Sheets

300

310

Print Job Scoring

Enter a weighted value for each component. Total of all fields must be 100%. Fields may be left blank.

1. Number of Pages
2. Types of Paper
3. Finishing Settings
4. Binding Settings
5. Exception Pages
6. Layout
7. Simplex/Duplex Settings
8. Number of Copies
9. Tab Sheets

TOTAL

Calculate  Cancel

CUSTOMIZED PRINT JOB ANALYSIS TO IDENTIFY JOB COMPLEXITY

BACKGROUND OF THE INVENTION

Field of the Invention

This invention relates to print shop management solutions, and in particular, it relates to a system and method for efficient managing and routing of print jobs in a print shop by use of a customized algorithm analyzing print job complexities.

Description of Related Art

In an environment that processes a large number of print jobs with multiple printers, there has been a need to manage print jobs efficiently in an organized fashion. Examples of such an environment are professional print shops and print/copy departments at large organizations, where a variety of print requests, such as large-volume duplication and large document printing, needs to be processed and completed by utilizing multiple printers within a short turn-around time. These environments are collectively referred to as "print shops" in this application.

Typically, each print job specifies a source file that electrically contains a document to be printed, such as an image-based PDF file, and a specification file (e.g., a JDF file) containing various settings, functions or parameters for the job, for example, the size, color and the type of the paper on which the document should be printed, the printing resolution, duplex or single-side printing, and certain finishing conditions, such as book, staple, collate printing, etc. The complexity of each print job may vary a lot, depending on its specific job settings, and sometimes, many other factors particular to the print shop receiving and processing the print job. Some print jobs can be very simple staple or fold finishing applications, while others can comprise a complex mix of "N-Up," "Binding," "Per Page Setting," "Folding," "Duplex" and many other operations.

When the print shop accumulates a large database of electronic print jobs with very different degrees of complexities, how to achieve an efficient processing turnaround requires careful consideration. On one hand, a printer needs to support all specific job settings of each print job. On the other hand, every printer in the print shop should also have a steady stream of jobs so that work can be done most efficiently and no printer is left in the waiting or idle mode.

Currently, the common practice in a print shop is, a print operator or print shop administrator would review the database of print jobs, which can be an application for storing all the print jobs in a queue and displaying them in a user-accessible GUI, or any other similar system in which multiple print jobs can be displayed, reviewed and sent to a printer. When there are multiple jobs, the print operator may still need to assign a job to the correct printer through a manual process. Typically, the print operator would open each print job and review the specific job settings (e.g., "Job Ticket") before sending the job to the correct printer. Some existing applications provide automated processing modules, which, when activated, can read print jobs and send them to the correct printers that support their settings. However, this option is rather limited and only suits those print jobs with simple settings. In the case of multiple jobs that exceed the capabilities of automated processing modules, some jobs would fail and thus, remain in the queue until they are manually reviewed and routed for further processing.

In light of the above, a need exists for an improved print shop solution that can analyze the job complexities of all print jobs. Another need also exists to enhance existing automated processing modules so that they can route and process print jobs more efficiently.

SUMMARY

Accordingly, the present invention is directed to a print shop management solution that substantially obviates one or more of the problems due to limitations and disadvantages of the related art.

An object of the present invention is to provide a customized algorithm for any given print shop to calculate the job complexities of print jobs so that print jobs can automatically routed to the correct printers based on their complexities.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a computerized method for managing print jobs in a print shop through a print shop management system. This method comprises the steps of allowing a user to assign weight factor values to a plurality of complex factors used to specify any print job; customizing an algorithm based on the assigned values; receiving a print job; and calculating a complexity score of the received print job by using the customized algorithm, wherein the complexity score falls within a range of scores, each score representing a different complexity level of a print job.

In another aspect, the present invention provides a computer program product comprising a computer usable non-transitory medium (e.g. memory or storage device) having a computer readable program code embedded therein for controlling a data processing system, the data processing system comprising a computer and one or more printers, the computer readable program code configured to cause the computer in the data processing system to execute the above method.

It is to be understood that both the foregoing general description and the following detailed description are exemplary and explanatory and are intended to provide further explanation of the invention as claimed.

BRIEF DESCRIPTION OF THE DRAWINGS

FIG. 3 is an exemplary graphic user interface (GUI) for assigning values to various complexity factors in a print job according to embodiments of the present invention.

DETAILED DESCRIPTION OF PREFERRED EMBODIMENTS

Embodiments of the present invention are directed to a print solution that provides efficient managing, routing and processing of print jobs in a print shop. Particularly, the print solution applies a customized algorithm that analyzes the job complexity of print jobs and based on the job complexity analysis, routes print jobs to the correct printers for printing.

One embodiment of the present invention allows a user to assign numeric values to different print functions, parameters or factors in a print shop. In one configuration, the values are manually assigned. In another configuration, an assessment application is provided to assist the user in assigning the values, where the application analyzes all print jobs processed by the print shop in a given time period (e.g., a month) and generates a report for the user's review so that the user can combine his/her intuitive sense with real-time data in assigning the values.

With the assigned values, the algorithm can be customized to calculate a complexity score of each print job according to one embodiment of the present invention. Furthermore, in one embodiment, a visualization of the complexity scores of print jobs is generated for the user's review. In another embodiment, the user can assign threshold values for automatically routing print jobs based on their complexity scores.

Figure 1:
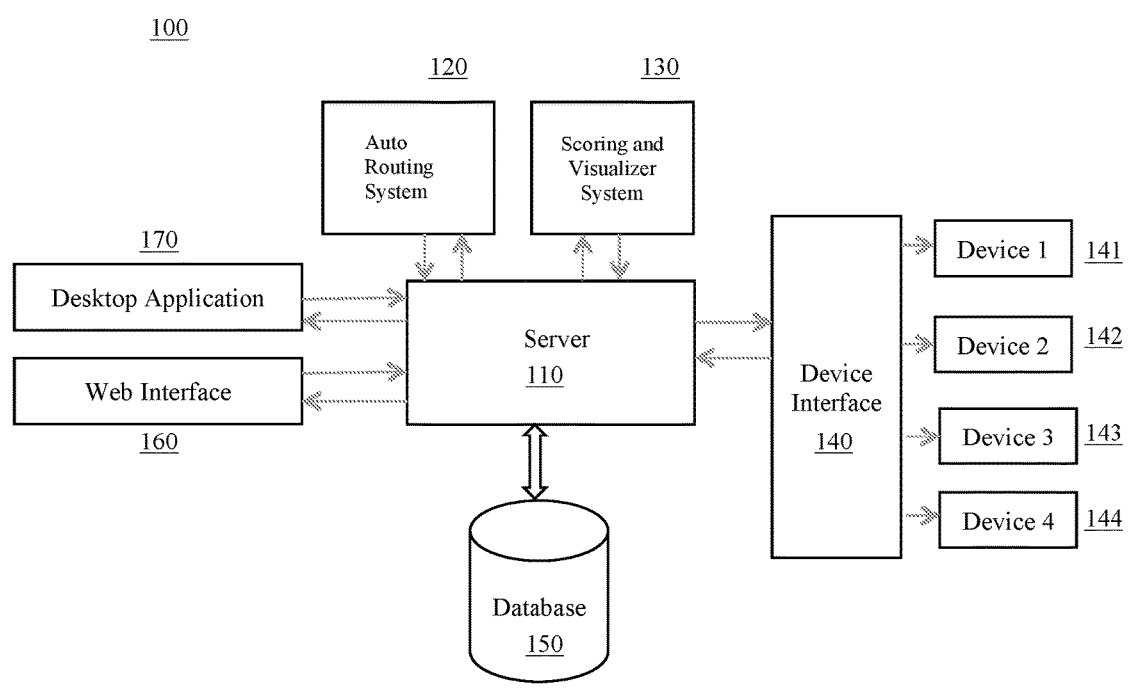
FIG. 1 is a block diagram providing an overview of a print shop management system in which embodiments of the present invention may be implemented.

Turning to FIG. 1, provided is an overview of a print shop management system in which embodiments of the present invention may be implemented. As shown in FIG. 1, this print shop management system 100 comprises a server 110 connected with a number of components, including an automated routing system 120, a scoring and visualizer system 130, a device interface 140, a database 150, a web interface 160 and a desktop application 170.

Usually some print job management software is installed and run on the server 110 for automated managing, processing and routing print jobs in a print shop. Preferably, such software is designed to run on Windows OS, Macintosh OS, or Unix X Windows or other popular computer operating systems implementing a GUI (graphic user interface), such as a touchscreen and/or a mouse and a keyboard, coupled with a display monitor. In addition to the print job management software, the server 110 is also configured to execute other types of software (e.g., administrative software), applications (e.g., network communication application), operating systems, etc.

In executing these software applications, the server 110 communicates with other components of the system in a LAN or WAN environment. For example, the server 110 communicates with the device interface 140, which is connected to a plurality of devices, such as devices 141, 142, 143 and 144. These devices comprise, for example, B&W printers, color printers, scanners, or combination thereof. Each device has one or more display monitors to display the status of the printing and various warning and instruction messages to a user. Each device is usually equipped with its own central processing unit (CPU) and appropriate hardware/software to control its own printing operations.

The database 150 accessible to the server 110 usually stores large amounts of print job data, including, without limitation, the print jobs received at the print shop, specifications of the printing/copying/scanning devices available to the print shop and user profiles.

In operation, a user may access the printing management system 100, or more specifically, the print job management software run on the server 110, via either the web interface 160 or the desktop application 170. Typically, a user may submit a print job request from the web interface 160, where a GUI is provided for the user to upload the file to be printed and/or fill out the printing requirements. On the other hand, the print shop operator may review, modify and send job requests via the desktop application 170, which usually is provided in one or more computers connected to the server 110.

As will be described in detail below, the scoring and visualizer system 130 allows a user to assign numeric values to various print functions or parameters (i.e., complex factors) so that an algorithm is customized to calculate complexity scores of each print job, and the automated routing system 120 allows a user to set threshold values so that print jobs can be automatically routed based on their complexity scores, and/or other factors. These two systems 120 and 130 are usually implemented as add-on features to the print job management software run by the server 110. Particularly, they are designed to improve existing automated processing modules in such print job management software.

Figure 2:
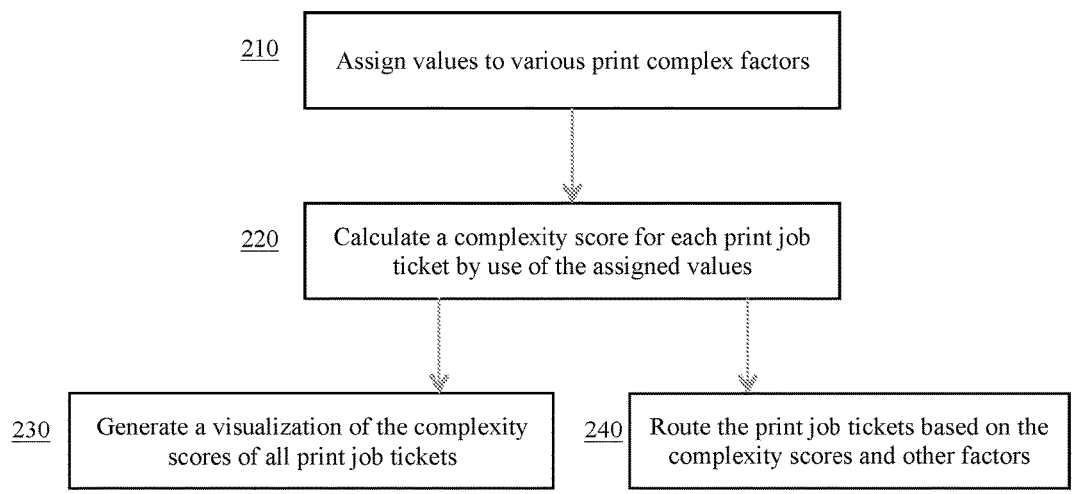
FIG. 2 is a flow chart diagram illustrating an exemplary process in the system of FIG. 1 in which embodiments of the present invention may be implemented.

In FIG. 2, a flow chart diagram illustrates, on a high level, an exemplary process in the scoring and visualizer system 130 and automated routing system 120. Details of each step in this process 200 will be described with reference to FIGS. 3-5 and examples below.

When a print job is received, the scoring and visualizer system automatically parses the print job and determines how complicated the job is based on a few print complex factors or parameters, for example, the following complex factors on a scale of 1-9 may be used to measure the complexity of a print job:

1. Number of Pages
2. Types of Paper
3. Finishing Settings (Staple/Punch/Fold/Trim)
4. Binding Settings (Perfect Bing/Ring Bing/Saddle Stitch)
5. Exception Pages
6. Layout
7. Simple/Duplex Settings
8. Number of Copies
9. Tab Sheets In measuring and calculating the complexity of a print, these factors as presented above are often given different weights. For example, factor #1 (number of pages) may weigh much more than factor #6 (layout) in determining the complexity of a print job. Thus, at step 210 in FIG. 2, the scoring and visualizer system allows a user to assign numeric values to various print complex factors, functions or parameters that are commonly used to define or specify a print job, such as the ones listed above. This step can be done via a customized GUI as illustrated in FIG. 3.

When the user, typically the print shop administrator, opens the customized GUI 300 in FIG. 3, a number of complex factors 310 are displayed for the user to assign numeric values. For example, if layout is the most complex factor for the print shop, the operator may assign a high value of 50 (or 50%), and lower values to the remaining factors, as long as the total value adds up to 100 (or 100%). When the user clicks the "Calculate" button on the GUI 300, the values assigned to various complex factors (so-called "Job Ticket" settings) will be used to generate a customized algorithm for the print shop, which calculates the complexity score of each print job. Table 1 below provides an example showing how this customized algorithm is generated to calculate complexity scores of print jobs.

TABLE 1

| Complexity Set # | x1 pages Attr1 | x2 paper Attr2 | x3 finisher Attr3 | x4 binding Attr4 | x5 exception Attr5 | x6 layout Attr6 | x7 si/du Attr7 | x8 copies Attr8 | x9 tabs Attr9 | Sum (x1-x9) Total |
|---|---|---|---|---|---|---|---|---|---|---|
| 1 | 20 | 18 | 17 | 15 | 10 | 5 | 5 | 5 | 5 | 100 |
| 2 | 16 | 14.4 | 13.6 | 12 | 8 | 4 | 4 | 4 | 4 | 80 |
| 3 | 12 | 10.8 | 10.2 | 9 | 6 | 3 | 3 | 3 | 3 | 60 |
| 4 | 8 | 7.2 | 6.8 | 6 | 4 | 2 | 2 | 2 | 2 | 40 |
| 5 | 4 | 3.6 | 3.4 | 3 | 2 | 1 | 1 | 1 | 1 | 20 |
| Values for Simplest Job | 4 | 3.6 | 0 | 0 | 0 | 0 | 0 | 1 | 0 | 8.6 |

As shown in Table 1, the nine complex factors as presented in FIG. 3, i.e., x1-x9, are assigned with respective numeric values, for example, 20, 18, 17, 15, 10, 5, 5, 5, 5, and the total (Sum (x1-x9)) is 100. Other complexity values in the table are calculated according to the formula below:

$$f(z)[1-9] = a1 \cdot f(b1) + a2 \cdot f(b2) + a3 \cdot f(b3) + a4 \cdot f(b4) + a5 \cdot f(b5) + a6 \cdot f(b6) + a7 \cdot f(b7) + a8 \cdot f(b8) + a9 \cdot f(b9)$$

or $$f(z)[1-9] = \sum_{i=1}^{n} a_i \cdot f(b_i)$$

In this formula, functions f(b1) to f(b9) are used to calculate the weights of each complex factor or parameter in a print job. For example, f(b1) is the function to calculate the weight of factor #1 (number of pages) in the job. In one embodiment, this function is based on an assumption that the difficulty levels of print jobs are divided into five (5), where each level is defined by a pre-selected page range: 1-50, 50-200, 200-500, 500-1000, and 1000 above. If level 1 is defined as the most difficult (100%) for the page range of 1000 above and assigned with a numeric value 20 (the function value is 20), then level 2, as the second difficult (80%), the calculated value by the function f(b1) will be 16 (=80% x20). Similarly, the function values for level 3 (60%), level 4 (40%), level 5 (20%) can be calculated accordingly. The calculated weights for the number of pages according to f(b1) are as follows:

| Difficulty Level | Number of pages | f(b1) |
|---|---|---|
| 1 - 100% | 1000+ | 20 |
| 2 - 80% | 500-1000 | 16 |
| 3 - 60% | 200-500 | 12 |
| 4 - 40% | 50-200 | 8 |
| 5 - 20% | 1-50 | 4 | f(b2) in the above formula is the function to calculate the weight of factor #2 (number of unique paper) in the job. The calculated weights for the number of pages according to f(b2) are as follows:

| Difficulty Level | Number of unique pages | f(b2) |
|---|---|---|
| 1 - 100% | 20+ | 18 |
| 2 - 80% | 15-20 | 14.4 |

-continued

| Difficulty Level | Number of unique pages | f(b2) |
|---|---|---|
| 3 - 60% | 10-15 | 10.8 |
| 4 - 40% | 5-10 | 7.2 |
| 5 - 20% | 1-5 | 3.6 | f(b3) is the function to calculate the weight of finisher attributes, such as staple, punch, trimming, etc., in the print job. The function f(b3) calculates the weight based on the number of all the finisher attributes in a finish job, typically from 1 to 5. The calculated weights for the number of finish attributes according to f(b3) are as follows:

| Difficulty Level | Number of finish attributes | f(b3) |
|---|---|---|
| 1 - 100% | 1 | 17 |
| 2 - 80% | 2 | 13.6 |
| 3 - 60% | 3 | 10.2 |
| 4 - 40% | 4 | 6.8 |
| 5 - 20% | 5 | 3.4 | f(b4) is the function to calculate the binding type based on the number of binding types, such as "Perfect Binding," "Ring binding," "Saddle Stitch," "Adhesive Binding," etc. The function f(b4) calculates the weight based on the number of the binding types, typically from 1 to 5. The calculated weights for the number of binding types according to f(b4) are as follows:

| Difficulty Level | Number of binding types | f(b4) |
|---|---|---|
| 1 - 100% | 1 | 15 |
| 2 - 80% | 2 | 12 |
| 3 - 60% | 3 | 9 |
| 4 - 40% | 4 | 6 |
| 5 - 20% | 5 | 3 | f(b5) is the function to calculate the weight of exception pages in a print job. The function calculates the weight based on the number of exception pages, typically in the range 1-3, 4-6, 7-9, 10-12, 13 and above. The calculated weights for the number of exception pages according to f(b5) are as follows:

| Difficulty Level | Number of exception pages | f(b5) |
|---|---|---|
| 1 - 100% | 13 and above | 15 |
| 2 - 80% | 10-12 | 12 |
| 3 - 60% | 7-9 | 9 |
| 4 - 40% | 4-6 | 6 |
| 5 - 20% | 1-3 | 3 | f(b6) is the function to calculate the layout based on the number of layouts, such as "Two in One," "Two Repeat," "Two Repeat Reversal," "Two Repeat Left/Right/Top/Down." The function calculates the weight based on the number of layout settings 1 to 5. The calculated weights for the number of layouts according to f(b6) are as follows:

| Difficulty Level | Number of Layout | f(b6) |
|---|---|---|
| 1 - 100% | 5 | 5 |
| 2 - 80% | 4 | 4 |
| 3 - 60% | 3 | 3 |
| 4 - 40% | 2 | 2 |
| 5 - 20% | 1 | 1 | f(b7) is the function to calculate the simplex/duplex type based on the number of simple/duplex. The function calculates the weight based on the number of simple duplex in the job values ranging from 1-5. The calculated weights for the number of simple/duplex according to f(b7) are as follows:

| Difficulty Level | Number of Layout | f(b7) |
|---|---|---|
| 1 - 100% | 5 | 5 |
| 2 - 80% | 4 | 4 |
| 3 - 60% | 3 | 3 |
| 4 - 40% | 2 | 2 |
| 5 - 20% | 1 | 1 | f(b8) is the Function to Calculate the Number of Copies in the Job. The Function Calculates the weight based on the number of copies in the in the page range 1-2, 3-5, 6-10, 11-20, 20 and above. The calculated weights for the number of copies according to f(b8) are as follows:

| Difficulty Level | Number of copies | f(b8) |
|---|---|---|
| 1 - 100% | 20 and above | 5 |
| 2 - 80% | 11-20 | 4 |
| 3 - 60% | 6-10 | 3 |
| 4 - 40% | 3-5 | 2 |
| 5 - 20% | 1-2 | 1 | f(b9) is the function to calculate the tab sheets in the job. The function calculates the weight based on the number of tab settings, typically in the range 1-2, 3-5, 6-10, 11-20, 20 and above. The calculated weights for the number of tab sheets according to f(b9) are as follows:

| Difficulty Level | Number of tab settings | f(b9) |
|---|---|---|
| 1 - 100% | 20 and above | 5 |
| 2 - 80% | 11-20 | 4 |
| 3 - 60% | 6-10 | 3 |
| 4 - 40% | 3-5 | 2 |
| 5 - 20% | 1-2 | 1 |

In the above formula, a1 is a weighted coefficient to keep the overall weight of f(b1) not to exceed x1% of the total job ticket rating. a2 is a weighted coefficient to keep the overall weight of f(b2) not to exceed x2% of the total job ticket rating. a3 is a weighted coefficient to keep the overall weight of f(b3) not to exceed x3% of the total job ticket rating. a4 is a weighted coefficient to keep the overall weight of f(b4) not to exceed x4% of the total job ticket rating. a5 is a weighted coefficient to keep the overall weight of f(b5) not to exceed x5% of the total job ticket rating. a6 is a weighted coefficient to keep the overall weight of f(b6) not to exceed x6% of the total job ticket rating. a7 is a weighted coefficient to keep the overall weight of f(b7) not to exceed x7% of the total job ticket rating. a8 is a weighted coefficient to keep the overall weight of f(b8) not to exceed x8% of the total job ticket rating. a9 is a weighted coefficient to keep the overall weight of f(b9) not to exceed x9% of the total job ticket rating.

As shown in Table 1, the most difficult print job is comprised of the highest difficulty levels (e.g., level 1) of all the complex factors, and the total value is 100. On the other hand, the simplest print job is comprised of the lowest difficulty levels (e.g., level 5) of applicable complex factors, for example, (1-50) pages (f(b1)=4), (1-5) unique pages (f(b2)=3.6), zero number of finisher attributes, zero number of binding type attributes, zero number of exception pages, zero number of layouts, zero number of simple/duplex, one (1) copy and zero number of tab sheets. As a result, the calculated value for the simplest job is 8.6. Hence, the Complexity Algorithm Output Maximum Value (omax) is 100, and the Complexity Algorithm Output Minimum Value (omin) is 8.6. Also, as shown in Table 1, the Minimum Value Displayed to the User (displaymin) is 1, and the Maximum Value Displayed to the User (displaymax) is 9.

Based on the values in Table 1, the complexity score of a print job is calculated using the following formula:

$$\text{Score} = ((iv - omin)/(omax - omin)) * (displaymax - displaymin) + displaymin$$

where iv=input value, omin=Complexity Algorithm Output Minimum Value, omax=Complexity Algorithm Output Maximum Value, displaymax=Maximum Value Displayed to the User, displaymin=Minimum Value Displayed to the User.

As an example, if a print job includes the following parameters:
1. Number of pages—252 pages
2. Number of unique papers—6
3. Finisher attributes—2
4. Binding Type—1
5. Exception pages—1

Then, input value (iv)=12+7.2+6.8+3+2=31 (see Table 1)
omin=output minimum=8.6
omax=ouput maximum=100
displaymin=display minimum=1 displaymax=display maximum=9

As a result, using the above formula and input value, the score of the job will be 10.56.

Figure 4:
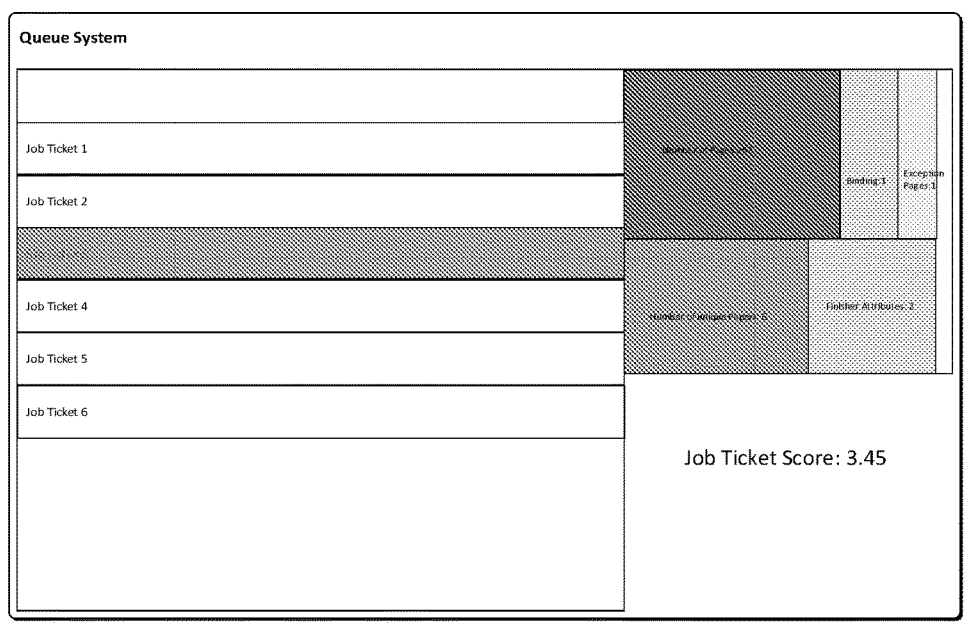
FIG. 4 presents an exemplary visualization of the complexity scores of a print job according to embodiments of the present invention.

Back to FIG. 2, when the job complexity score is calculated, the process proceeds to step 230 where a visualization of the complexity scores of print jobs is generated by the scoring and visualizer system. One example of such visualization is illustrated in FIG. 4. The visualizer uses the data from each print Job and generates a heat map using some heat map creation software. Each block in the heat map is driven by the data from the formula mentioned above. The surface area of the block is determined by the value of the function of the parameter listed in Table 1. This data is programmatically fed to the heat map creation software.

Figure 5:
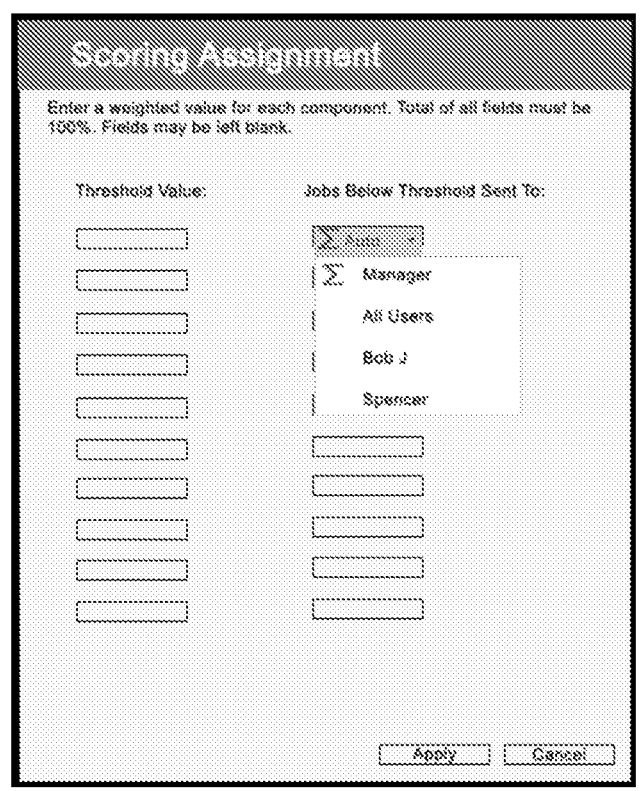
FIG. 5 is an exemplary GUI for managing and routing printing jobs according to embodiments of the present invention.

At step 240, the print job tickets are routed based on the complexity scores and some other factors determined by the print shop operator. For example, the scores can be used for routing the print job via an exemplary GUI as illustrated in FIG. 5. Through the GUI in FIG. 5, a user can use the scoring system to automate the printing process by setting threshold values for job routing options. Below are some examples:

Example #1: if "Threshold Value"=3 and "Jobs Below Threshold Sent To" is set to "Auto," all jobs rated 3 and below will be automatically sent to a printer for processing. Usually these jobs with scores below 3 are easy jobs and required no human interaction.

Example #2: if "Threshold Value"=7 and "Jobs Below Threshold Sent To" is set to "All Users," all jobs rated between 3.1 and 7 will be automatically sent to "All Users" for processing. These jobs usually require some hands-on work but any employee operating the software can process the jobs.

Example #3: If "Threshold Value"=9 and "Jobs Below Threshold Sent To" is set to "Manager," all jobs rated between 7.1 and 9 will be automatically sent to a "Manger" for processing. These are the most complex jobs and require a manager to sign off on them.

By use of the GUI in FIG. 5, the print shop administrator may assign jobs based on their ratings and thus create a more efficient workflow. Each print shop operator would use the numbers in a way meaningful to the particulars of their shop to better manage their tasks. Additionally, by assigning these values, the print shop operator can immediately tell which jobs require the most effort. Low scoring jobs may be easily processed without review, saving the operator the time of opening each individual job ticket and deciding how to move forward. Higher scoring jobs may still need to be opened and reviewed, but by identifying them from the onset, the work that requires more hands-on attention is identified and the operator may immediately devote his/her time to these more complex jobs, making sure that they are processed in a timely manner. Having customized the algorithm that assigns the values, the process is even more specific to the shop and should improve pre-processing time significantly.

Figure 7:
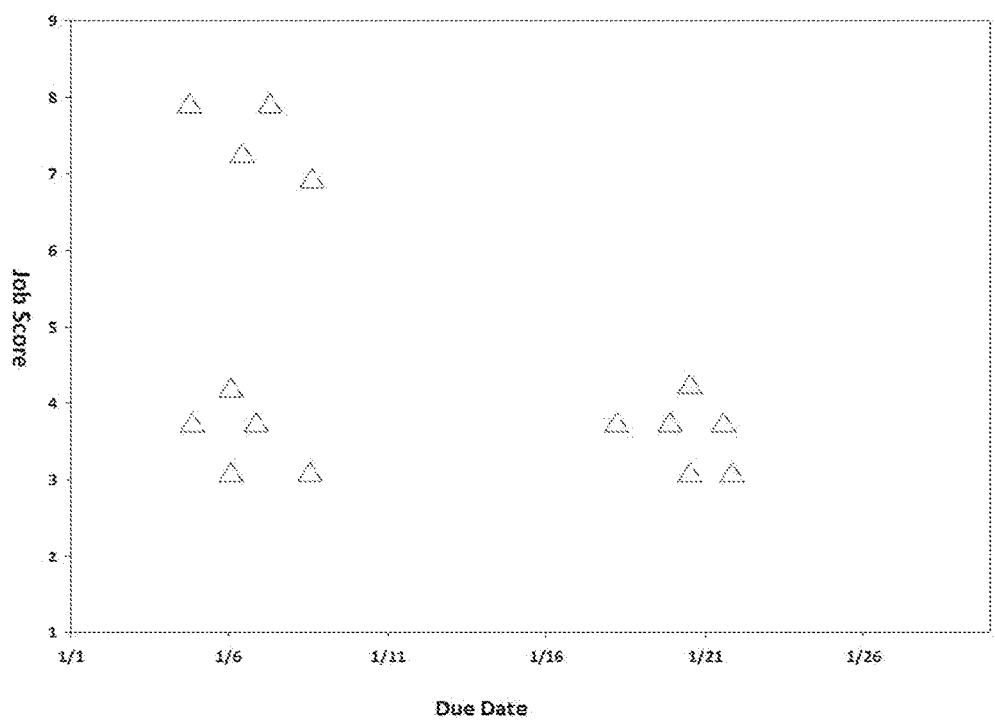
FIG. 7 illustrates a graphic representation of print jobs according to embodiments of the present invention.

In some cases, jobs may be more complicated. In order to aid the print shop administrator with processing decisions, a visual grid can plot each job as a point. An additional feature may also be a graph-based representation of the print jobs that takes the numeric value and plots it on a graph in relationship to a secondary feature, for example, the time out for the due date of the job. FIG. 7 shows one example:

As shown in FIG. 7, the graph is plotted with "Due Date" on the x coordinate and "Job Score" on the y coordinate. Using this tool, the print shop manager can create rules to assign jobs based on the range on x and y coordinates. The manager can assign job score 2-4.5 and due date 1/1 to 1/11 to "Auto Mode," a job score 2-4.5 and due date to 1/16 to 1/26 to a junior print job operator, and a score 6-8.0 and due date to 1/1 to 1/11 to a senior print job operator.

The above-described method requires the print shop administrator assign values based on their understanding of the print shop's needs. Alternatively, an assessment application can be created to analyze the jobs run through a print shop over a specified period of time (e.g., one month). When that is completed, a report can be generated that identifies the jobs that take the longest to process as well as the print settings associated with such jobs. From such a report, the print shop administrator has more real-time data to combine with his/her intuitive sense of which settings make for the most complex jobs. As a result, both factors are used to enter values in the print job scoring GUI, such as the one shown in FIG. 3.

Although GUI examples (FIGS. 3 and 5) are shown and described in detail here, the invention is not limited to the specifics of these exemplary GUIs. The invention may be implemented using any forms of GUIs, as long as the GUI includes input means that allows the user to enter input data such as the numeric values and threshold values to be assigned. The input means may be buttons, check boxes, radio buttons, text input fields, drop-down menus, pop-up menus, icons, tabs for bringing up different sheets, separate windows, etc., or combinations thereof, or any other suitable structure of allowing the user to input information to the computer. The computer software designs for suitable structures of the input means are apparent and familiar to a person of ordinary skill in this field. Therefore, detailed descriptions for these structures are omitted from here.

Figure 6:
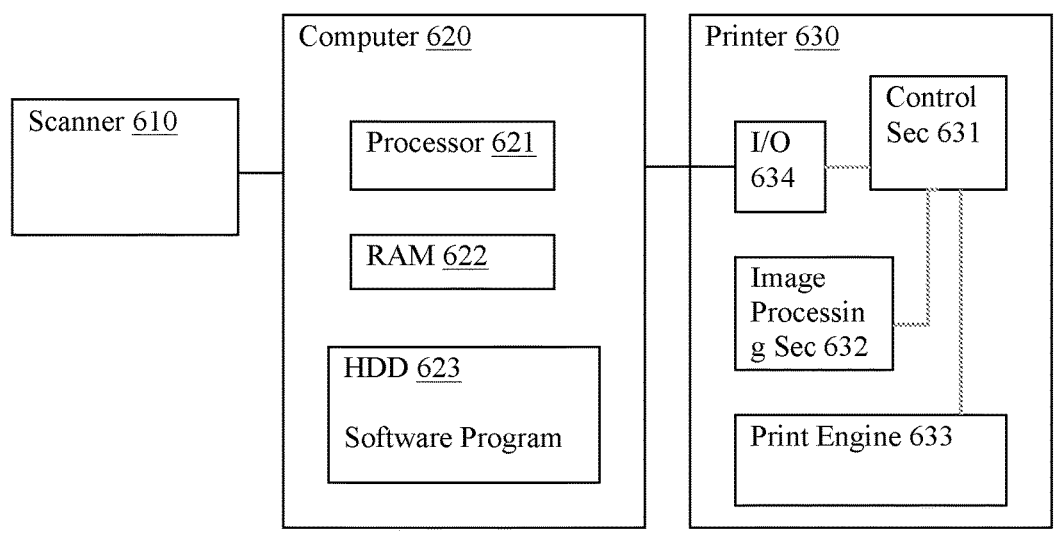
FIG. 6 schematically illustrates configurations of various devices including a printer in the system of FIG. 1 in which embodiments of the present invention may be implemented.

The methods described above are implemented in a data processing system, which includes a computer and a printer, scanner and/or copier connected to the computer. The typical structure of the data processing system is shown in FIG. 6. The data processing system 600 includes a scanner 610, a computer 620, and a printer 630, which are connected each other. The computer 620 comprises a processor 621, an internal memory (e.g. a RAM) 622 and a hard disk drive 623. The storage device 623 stores software programs, which are read out to the RAM 622 and executed by the processor 621 to carry out the methods. The processor 621 executes the software programs in the hard disk drive 622 to carry out the methods as described above. In this typical example, the computer receives assigned values for complex factors, calculates complexity scores for each job ticket based on the assigned values, generates a visualization of the complexity scores and sends the job tickets to the destination computers. The actual printing can be done in the printer 630.

It will be apparent to those skilled in the art that various modification and variations can be made in the above-described method and system of the present invention without departing from the spirit or scope of the invention. Thus, it is intended that the present invention cover modifications and variations that come within the scope of the appended claims and their equivalents.

What is claimed is:

1. A computerized method for managing print jobs in a print shop through a print shop management system, the method comprising:
   providing a GUI (graphic user interface) allowing a user to assign respective weight factor values to a plurality of complex factors used to specify any print job;
   receiving user-assigned weight factor values from the GUI;
   customizing an algorithm for automatically scoring and routing print jobs based on the user-assigned weight factor values;
   receiving a print job;
   applying the customized algorithm to calculate a complexity score of the received print job, wherein the complexity score falls within a range of scores, each score representing a different complexity level of a print job; and
   routing the received print job to a destination printer based on the calculated complexity score.

2. The method of claim 1, wherein the print job is defined by a print job ticket comprising specifications of the complex factors applicable to the print job.

3. The method of claim 1, further comprising:
generating a visualization of the calculated complexity score of the received print job, the visualization comprising a heat map including one or more blocks driven by the print job data.

4. The method of claim 1, further comprising:
allowing the user to assign threshold values for automatically routing print jobs;
comparing the complexity score of the received print job to the assigned threshold values; and
based on the comparison, sending the received print job for printing according to pre-defined routing options.

5. The method of claim 4, wherein the threshold values are assigned based on complexity scores of print jobs in the print shop.

6. The method of claim 4, further comprising:
generating a visual representation including the complexity score and a secondary feature in the print shop, wherein the visual representation is used by the user in assigning the threshold values.

7. The method of claim 1, further comprising:
analyzing print jobs run through the print shop over a pre-determined period of time;
generating a report based on the analysis; and
allowing the user to assign the values based on the report.

8. The method of claim 1, wherein the customized algorithm calculates complexity scores by using a mathematical formula as follows:

$$f(z)[1-9] = \sum_{i=1}^{n} a_i \cdot f(b_i)$$

wherein $f(b_i)$ is a function to calculate one of the plurality of complex factors in the print job, and $a_i$ is a weighted coefficient.

9. A computer program product comprising a computer usable non-transitory medium having a computer readable program code embedded therein for controlling a data processing system, the data processing system including at least a computer and one or more printers, the computer readable program code configured to cause the computer of the data processing system to execute a process for managing print jobs in a print shop, the process comprising:
providing a GUI (graphic user interface) allowing a user to assign respective weight factor values to a plurality of complex factors used to specify any print job;
receiving user-assigned weight factor values from the GUI;
customizing an algorithm for automatically scoring and routing print jobs based on the user-assigned weight factor values;
receiving a print job;
applying the customized algorithm to calculate a complexity score of the received print job, wherein the complexity score falls within a range of scores, each score representing a different complexity level of a print job; and
routing the received print job to a destination printer based on the calculated complexity score.

10. The computer program product of claim 9, wherein the print job is defined by a print job ticket comprising specifications of the complex factors applicable to the print job.

11. The computer program product of claim 9, wherein the process further comprises:
generating a visualization of the complexity score of the print job, the visualization comprising a heat map including one or more blocks driven by the print job data.

12. The computer program product of claim 9, wherein the process further comprises:
allowing the user to assign threshold values for automatically routing print jobs;
comparing the complexity score of the received print job to the assigned threshold values; and
based on the comparison, sending the received print job for printing according to pre-defined routing options.

13. The computer program product of claim 12, wherein the threshold values are assigned based on complexity scores of print jobs in the print shop.

14. The computer program product of claim 12, wherein the process further comprises:
generating a visual representation including the complexity score and a secondary feature in the print shop, wherein the visual representation is used by the user in assigning the threshold values.

15. The computer program product of claim 9, further comprising:
providing an application that analyzes all print jobs run through the print shop over a pre-determined period of time;
generating a report based on the analyses by the application, wherein the report includes real-time data regarding all print jobs; and
allowing the user to assign the values based on the report.

16. The computer program product of claim 1, wherein the customized algorithm calculates complexity scores by using a mathematical formula as follows:

$$f(z)[1-9] = \sum_{i=1}^{n} a_i \cdot f(b_i)$$

wherein $f(b_i)$ is a function to calculate one of the plurality of complex factors in the print job, and $a_i$ is a weighted coefficient.

* * * * *